(12) United States Patent
Li

(10) Patent No.: US 12,085,800 B2
(45) Date of Patent: Sep. 10, 2024

(54) FOCUS-ADJUSTABLE LIQUID CRYSTAL EYEGLASSES

(71) Applicant: Wicue, Inc., Cupertino, CA (US)

(72) Inventor: Fenghua Li, Cupertino, CA (US)

(73) Assignee: Wicue USA INC.

( * ) Notice: Subject to any disclaimer, the term of this patent is extended or adjusted under 35 U.S.C. 154(b) by 73 days.

(21) Appl. No.: 17/892,382

(22) Filed: Aug. 22, 2022

(65) Prior Publication Data

US 2023/0058115 A1     Feb. 23, 2023

Related U.S. Application Data

(60) Provisional application No. 63/236,114, filed on Aug. 23, 2021.

(51) Int. Cl.
| | | |
|---|---|---|
| *G02F 1/1335* | (2006.01) | |
| *G02B 3/08* | (2006.01) | |
| *G02C 7/06* | (2006.01) | |
| *G02F 1/1339* | (2006.01) | |

(52) U.S. Cl.
CPC ......... *G02F 1/133526* (2013.01); *G02B 3/08* (2013.01); *G02C 7/06* (2013.01); *G02F 1/1339* (2013.01)

(58) Field of Classification Search
CPC ..... G02F 1/294; G02F 1/133526; G02B 3/14; G02B 3/08; G02C 7/083; G02C 7/06; G02C 7/086; G02C 2202/20
See application file for complete search history.

(56) References Cited

U.S. PATENT DOCUMENTS

| | | | | |
|---|---|---|---|---|
| 2004/0021929 A1* | 2/2004 | Nishioka | ........... | G02C 7/083 359/319 |
| 2018/0314087 A1* | 11/2018 | Ito | ........... | G02F 1/133524 |
| 2019/0278153 A1* | 9/2019 | Zhao | ........... | G02F 1/29 |

* cited by examiner

*Primary Examiner* — Angela K Davison
(74) *Attorney, Agent, or Firm* — PV IP PC; Wei Te Chung

(57) ABSTRACT

Described are examples of adjustable focus glasses formed using liquid crystal. A pair of adjustable focus glasses can include a frame and two lenses arranged on the frame. In some examples, at least one of the two lenses is a lens assembly that includes a plano-concave lens, a Fresnel lens, and a liquid crystal layer between the plano-concave lens and the Fresnel lens. The plano-concave lens includes a planar surface and an opposing concave surface. The Fresnel lens includes a Fresnel surface and an opposing convex surface. The planar surface and the Fresnel surface face the liquid crystal layer. The focus position of the lens assembly can be adjusted through changing the refractive index of the liquid crystal layer, using appropriate control signals from an electronic controller. This conveniently allows the adjustable focus glasses to be multi-purpose and suitable for correcting both myopia and hyperopia.

23 Claims, 5 Drawing Sheets

FOCUS-ADJUSTABLE LIQUID CRYSTAL EYEGLASSES

CROSS-REFERENCE TO RELATED APPLICATIONS

This application claims the benefit of U.S. Provisional Application No. 63/236,114, filed Aug. 23, 2021, entitled "FOCUS-ADJUSTABLE LIQUID CRYSTAL GLASSES" which is incorporated herein by reference in its entirety.

TECHNICAL FIELD

The present disclosure generally relates to eyeglasses for correction of vision problems such as near-sightedness. In particular, aspects of the present disclosure relate to adjustable focus liquid crystal glasses.

BACKGROUND

Some people who suffer from myopia (near-sightedness) can develop hyperopia (far-sightedness) over time as they age. After the onset of hyperopia, these people typically need to wear near-sighted glasses when looking at things farther away, and they need to wear far-sighted glasses when looking at things a little closer. In other words, these people need to have access to two pairs of glasses at any time, and there are certain inconveniences in work and life. Alternatively, some people may choose to wear bifocal glasses, which have two-part lenses, one part that corrects near-sightedness and another part that corrects far-sightedness. Bifocals are a compromise in terms of aesthetics (the seam between the two parts is usually very noticeable) and performance (the field of view is smaller since each part takes up half a lens instead of a full lens).

The main difference between myopia glasses and hyperopia glasses is that myopia glasses have a negative focal length, while hyperopia glasses have a positive focal length. In either case, the focal length is fixed because the curvature of the lenses cannot be changed. If eyeglasses that can adjust focal position can be developed, it would greatly improve quality of life for people suffering from both myopia and hyperopia.

SUMMARY

Aspects of the disclosure are directed to eyeglasses (referred to herein simply as "glasses") that have adjustable focus and techniques for manufacturing such glasses. In some embodiments, adjustable focus glasses are formed using liquid crystal technology.

In some examples, a pair of adjustable focus glasses comprises a frame and a lens assembly arranged on the frame. The lens assembly includes a liquid crystal layer between a first lens and a second lens. The first lens is a plano-concave lens. The planar surface of the plano-concave lens faces the liquid crystal layer and the second lens, which is a Fresnel lens. The Fresnel surface of the Fresnel lens faces the liquid crystal layer and the first lens. The surface of the Fresnel lens opposite to the Fresnel surface is convex. In some examples, the liquid crystal layer is a liquid crystal film.

The lens assembly can include a pair of electrically conductive layers on opposite sides of the liquid crystal layer. Further, in some implementations, the lens assembly further includes an insulating film that is formed of an electrically insulating material (e.g., silicon dioxide) and configured to prevent the conductive layers from contacting each other. The conductive layers can include a first indium tin oxide (ITO) layer or film and a second ITO layer/film. The first ITO layer can be provided on the planar surface of the plano-concave lens, and the second ITO layer can be provided on the Fresnel surface of the Fresnel lens. For example, the first ITO layer may be electroplated onto the planar surface, and the second ITO layer may be electroplated onto the Fresnel surface. When a voltage is applied across the first ITO layer and the second ITO layer, the liquid crystal molecules in the liquid crystal layer may change orientation, which in turn changes the refractive index of the liquid crystal layer.

In some examples, the liquid crystal layer is controlled using a controller and a power supply electrically connected to the controller. The power supply can be a battery or other power source. The controller and the power supply can be arranged on the frame of the glasses to form a control assembly electrically connected to the lens assembly. The controller is configured to transition the liquid crystal layer between a first state and a second state. The refractive index of the liquid crystal layer changes according to the state of the liquid crystal layer. In particular, the liquid crystal layer has a first refractive index in the first state and a second refractive index in the second state. In some examples, the controller may be configured to transition the liquid crystal layer into an intermediate state between the first state and the second state. The lenses in the lens assembly have their own refractive indices, which can be the same. For example, the refractive index of the first lens and the refractive index of the second lens may be the same when the first lens and the second lens are formed using the same material (e.g., glass or polycarbonate).

In some examples, the liquid crystal layer is formed of liquid crystal material configured to transition between an energized state (e.g., when a voltage is applied) and a non-energized state (e.g., when no voltage is applied). Alternatively or additionally, the liquid crystal material may be configured to transition between multiple energized states (e.g., based on different voltage levels). Further, the liquid crystal material may be configured to stay in an energized state after an applied voltage is discontinued or to revert to an initial state (e.g., the non-energized state) when the voltage is no longer being applied. Because the focal position of the lens assembly is dependent of the refractive indices of the optical media within the lens assembly (e.g., the first lens, the second lens, and the liquid crystal layer), changing the refractive index of the liquid crystal layer will produce a corresponding change in the focal position of the lens assembly. The focal position may, for example, be switched between a first focal position suitable for correcting myopia and a second focal position suitable for correcting hyperopia. Accordingly, the techniques described herein can be applied to provide glasses that are multi-purpose.

BRIEF DESCRIPTION OF THE DRAWINGS

Illustrative embodiments are described in detail below with reference to the following figures.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
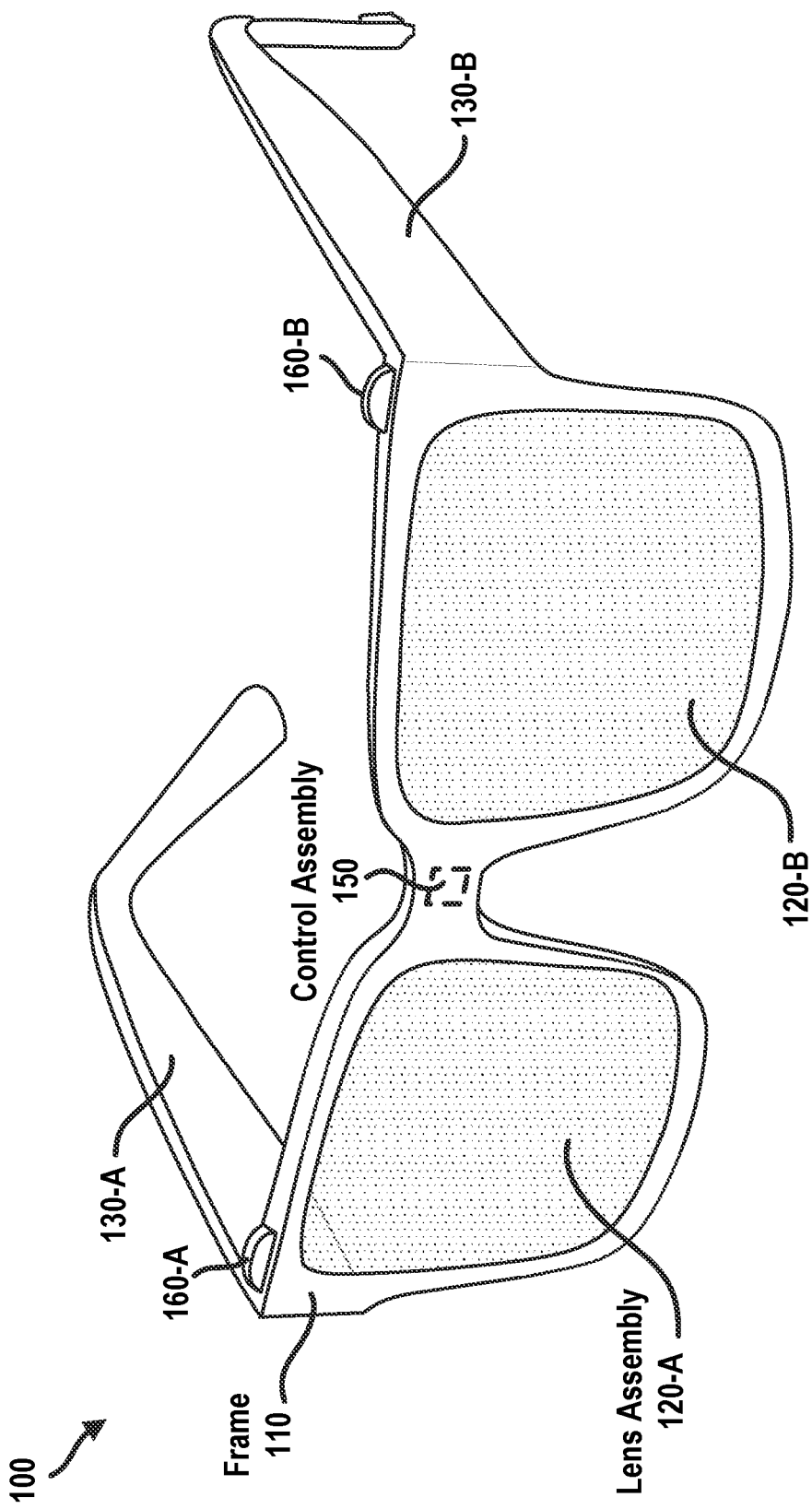
FIG. 1 shows a pair of adjustable focus liquid crystal glasses, according to some embodiments.

FIG. 1 shows a pair of adjustable focus liquid crystal glasses 100, according to some embodiments. The glasses 100 include a frame 110, a first lens assembly 120-A and a second lens assembly 120-B. The frame 110 is shaped to be worn over the head of a user, e.g., with arms or temples 130-A and 130-B resting on top of the user's ears. The frame 110 includes openings or lens mounting surfaces to accommodate the lens assemblies 120A and 120B. The thickness of the frame 110 may depend on the thickness of the lens assemblies. In general, the frame 110 can be formed of any suitably rigid material that can hold the lens assemblies securely in place, e.g., via friction fit. When the glasses 100 are worn, each lens assembly 120 is positioned in front of a corresponding eye of the user. For instance, the first lens assembly 120-A may be positioned in front of a right eye, and the second lens assembly 120-B may be positioned in front of a left eye.

Figure 2:
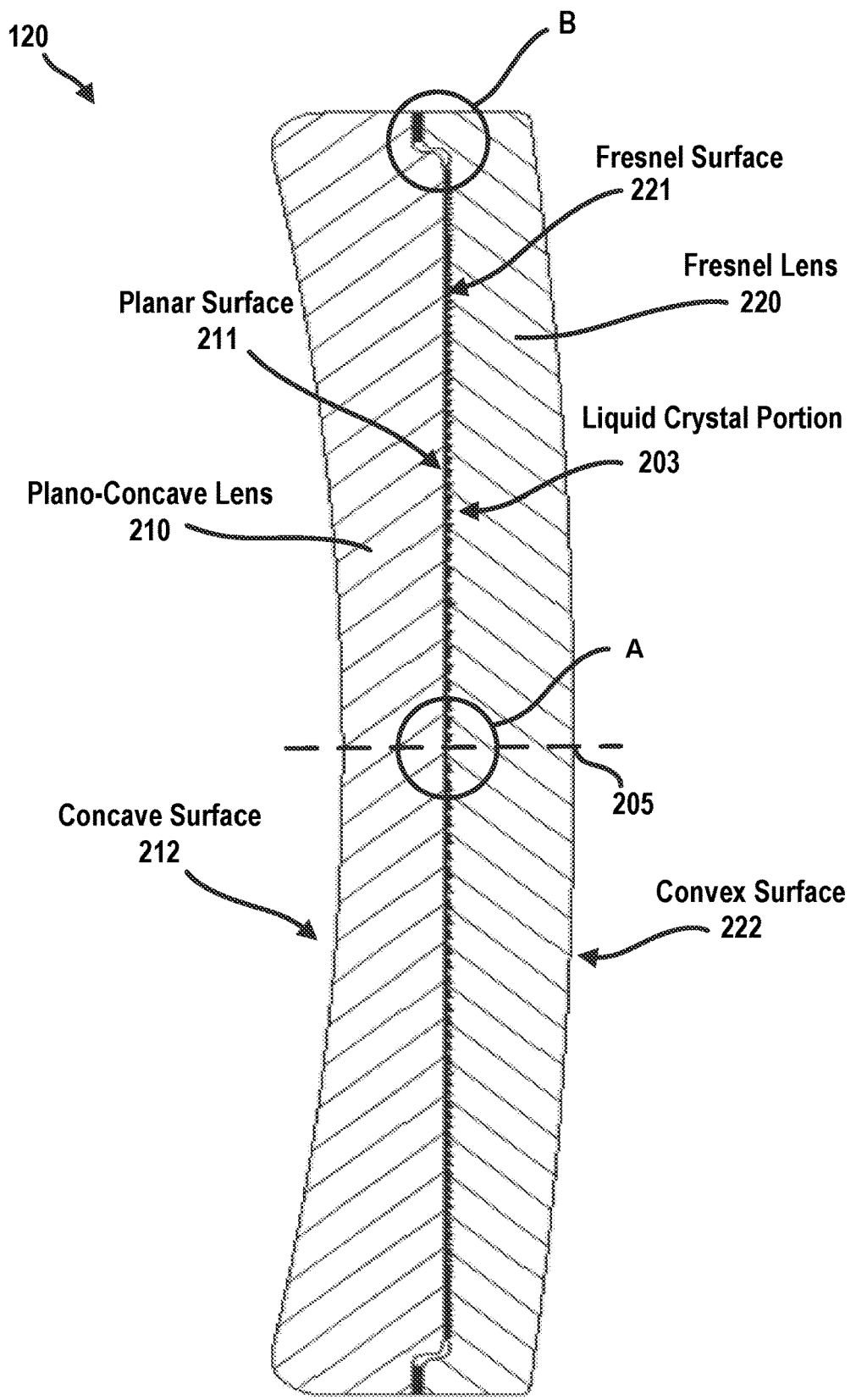
FIG. 2. is a cross-sectional view of a lens assembly, according to some embodiments.

FIG. 2 is a cross-sectional view of a lens assembly 120, according to some embodiments. The lens assembly 120 is an optical system that includes a liquid crystal portion 203, a first lens 210, and a second lens 220. The liquid crystal portion 203 is located between the first lens 210 and the second lens 220 and is relatively thin so that the lenses 210 and 220 are positioned close to each other. The lenses 210 and 220 can be formed of glass material, e.g., mineral glass. However, other materials suitable for lenses, such as polycarbonate, can be used to form the first lens 210 and the second lens 220.

The first lens 210 is a plano-concave lens including a planar surface 211 and a concave surface 212 opposite the planar surface 211. The planar surface 211 is adjacent to the liquid crystal portion 203 and faces the second lens 220. The second lens 220 is a Fresnel lens including a Fresnel surface 221 and a convex surface 222 opposite the Fresnel surface 221. The Fresnel surface 221 is adjacent to the liquid crystal portion 203 and faces the first lens 210.

The first lens 210 is a spherical lens, and the second lens 220 is an aspheric lens. The optical axis of the lens assembly 120 may correspond to a line 205 connecting the center point of the first lens 210 and the center point of the second lens 220. The line 205 may be perpendicular to the planar surface 211 of the first lens 210.

The liquid crystal portion 203 has a refractive index that can be changed by controlling the on-off state of the liquid crystal material so that the focal position of the lens assembly 120 is changed, thereby allowing the glasses 100 to become near-sighted glasses or far-sighted glasses. The liquid crystal portion 203 includes a layer of liquid crystal material. An example of the structure of the liquid crystal portion 203 is shown in FIG. 3.

Figure 3:
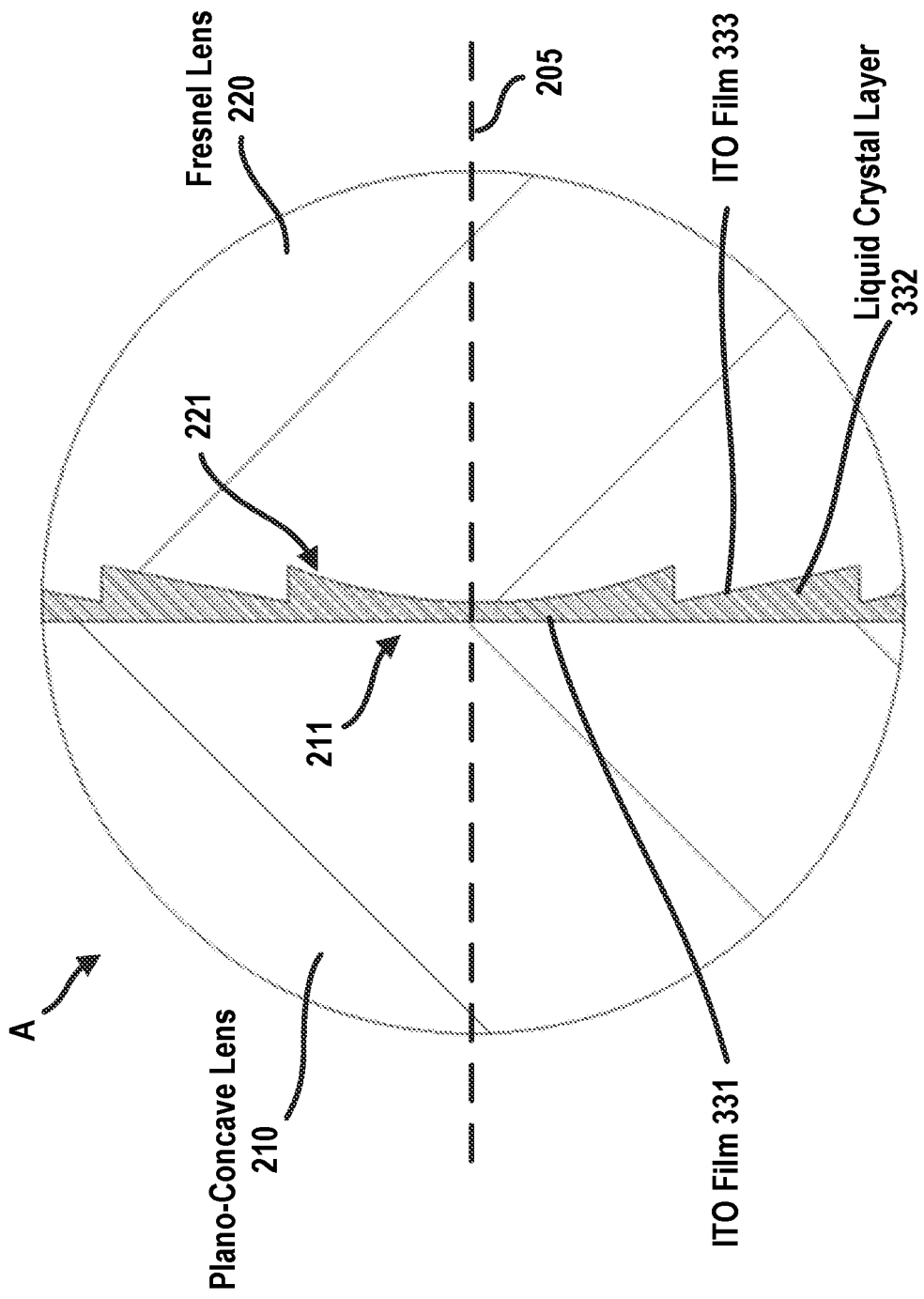
FIG. 3 is an enlarged view of a first portion of the lens assembly in FIG. 2.

FIG. 3 is an enlarged view of a first portion of the lens assembly 120, labeled "A" in FIG. 2. As shown in FIG. 3, the lens assembly 120 may include a first indium tin oxide (ITO) film 331, a liquid crystal layer 332, and a second ITO film 333, in that order. The first ITO film 331 may be disposed on the planar surface 211 of the plano-concave lens 210. The second ITO film 333 may be disposed on the Fresnel surface 221 of the Fresnel lens 220. The first ITO film 331 can be formed by electroplating ITO, which is an electrically conductive material, onto the planar surface 211 of the plano-concave lens 210. Similarly, the second ITO film 333 can be formed by electroplating ITO onto the Fresnel surface 221 of the Fresnel lens 220.

Both ITO films 331 and 333 may be electrically connected to a controller (not shown in FIG. 3) that generates respective control signals for each ITO film. In some embodiments, the ITO films 331 and 333 are indirectly connected to the controller through a power supply device that outputs the control signals. The power supply device generates the control signals under the instruction of the controller. The controller is configured to set the voltage levels of the control signals so that a voltage difference is established between the ITO films 331 and 333, thereby applying a voltage to the liquid crystal layer 332. In this manner, the arrangement direction or alignment of the liquid crystal molecules in the liquid crystal layer can be changed according to the magnitude of the voltage. In turn, the way in which the liquid crystal molecules are arranged will influence the refractive index of the liquid crystal layer 332. The controller can be implemented as an electronic circuit that includes analog and/or digital control logic. In some embodiments, the controller and the power supply device may form a control assembly contained in a shared housing.

Figure 5:
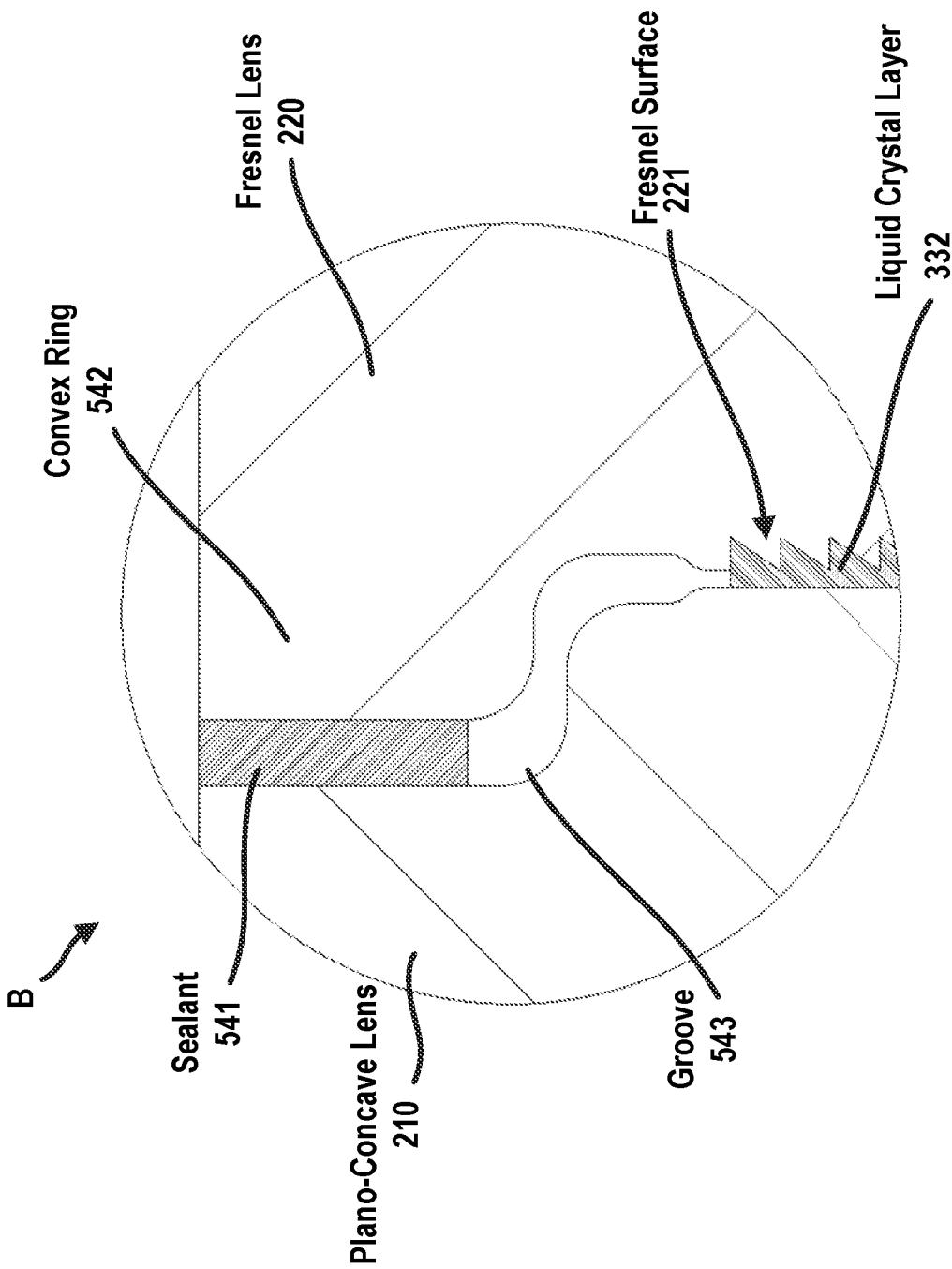
FIG. 5 is an enlarged view of a second portion of the lens assembly in FIG. 2.

From the examples described above in conjunction with FIGS. 2 and 3, it can be seen that the liquid crystal portion 203 has a simple structure and is easy to process and shape. The plano-concave lens 210 and the Fresnel lens 220 can operate to confine the liquid crystal layer without the aid of additional substrates. For example, the planar surface 211 of the plano-concave lens 210 and the Fresnel surface 221 of the Fresnel lens 220 can define walls of a liquid crystal cell comprising the liquid crystal portion 203. The liquid crystal layer 332 is confined between the planar surface 211 and the Fresnel surface 221 and may be prevented from leaking out of the lens assembly 120 by introducing a sealant around the edges of the lens assembly, as shown in FIG. 5 (described below). Alternatively, in some embodiments, the liquid crystal portion 203 can be a liquid crystal assembly (e.g., a liquid crystal film) that includes liquid crystal material between a pair of substrates, with the lenses 210 and 220 being added onto the liquid crystal assembly by attaching each lens to a respective substrate to form the lens assembly 120.

Figure 4:
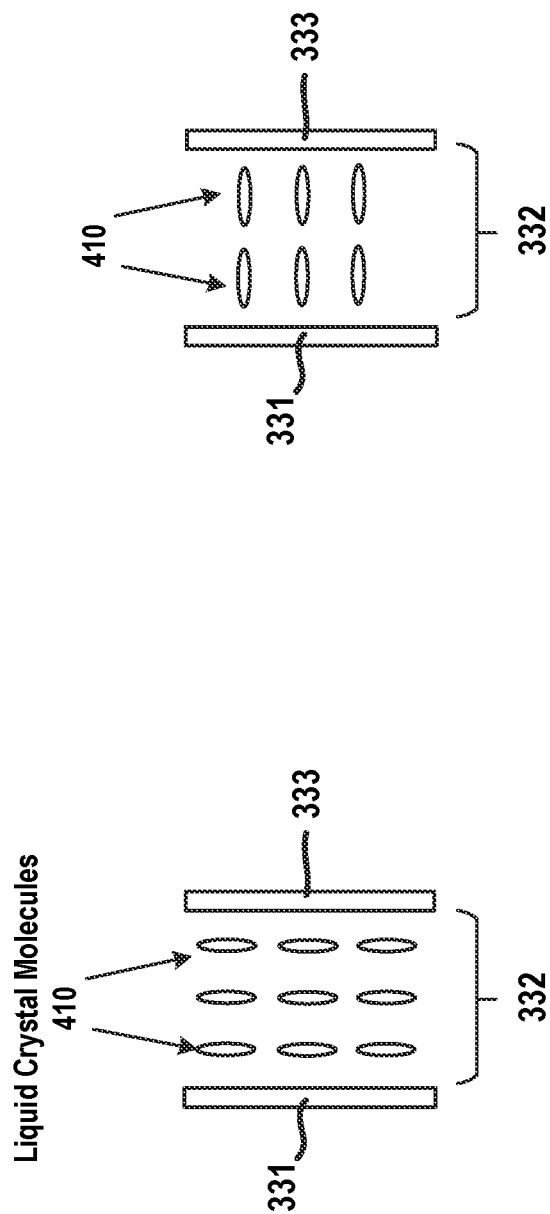
FIG. 4 shows an example of how the refractive index of a liquid crystal material can be changed, according to some embodiments.

FIG. 4 shows an example of how the refractive index of a liquid crystal material can be changed, according to some embodiments. In FIG. 4, the liquid crystal layer 332 comprises liquid crystal molecules 410, which may have an elliptical shape. When the liquid crystal molecules 410 are aligned along a first direction (e.g., along the long axis of the molecules), the molecules will refract light in accordance with a first refractive index. When the liquid crystal molecules 410 are aligned along a second direction (e.g., along the short axis of the molecules), the molecules will refract light in accordance with a second refractive index that is different from the first refractive index. In both the first direction and the second direction, the liquid crystal molecules 410 may be configured to permit refracted light to travel across the liquid crystal layer 332. For example, light that is incident upon the convex surface 222 of the Fresnel lens 220 may be refracted before exiting the concave surface 212 of the plano-concave lens 210. Similarly, light that is incident upon the concave surface 212 may be refracted before exiting the convex surface 222.

Depending on the voltage difference between the first ITO film 331 and the second ITO film 333, the liquid crystal molecules 410 may be oriented so as to be fully aligned with the first direction, fully aligned with the second direction, or somewhere in between the first direction and the second direction. Therefore, the refractive index of the liquid crystal layer 332 is a function of the arrangement directions of the liquid crystal molecules 410 and the refractive indices associated with the arrangement directions. To function as eyewear, the lens assembly 120 should remain optically transparent. That is, the liquid crystal layer 332 should maintain a relatively high degree of light transmittance across at least some states. For example, it may be beneficial to configure the lens assembly so that there is little or no change in transmittance when switching between a focal position for correcting myopia and a focal position for correcting presbyopia. However, depending on the configuration of the liquid crystal molecules 410, it may be possible that dimming or brightening of the lens assembly can occur in certain states.

The plano-concave lens 210 and the Fresnel lens 220 also have their own refractive indices, which are fixed. In some embodiments, the lenses 210 and 220 have the same refractive index, e.g., due to being formed of the same material. The overall refractive behavior (e.g., the refractive power) of the lens assembly 120 is a function of the relative refractive indices between the various optical media of the lens assembly, including the lenses 210, 220 and the liquid crystal layer 332. A relative refractive index exists at the interface between the plano-concave lens 210 and the liquid crystal layer 332. A relative refractive index also exists at the interface between the liquid crystal layer 332 and the Fresnel lens 220. The focal position of the lens assembly 120 will therefore change depending on the state of the liquid crystal layer 332. This is because focal length is inversely proportional to the refractive power of a lens or optical system.

In some embodiments, the liquid crystal portion 203 may have a stable configuration. In a stable configuration, the liquid crystal molecules tend to stay in a predefined orientation until an outside force, such as a voltage, acts on the liquid crystal molecules. For example, the liquid crystal molecules 410 may have an initial orientation in the absence of any voltage being applied to the ITO films 331 and 333. When the controller causes a first voltage to be generated across the ITO films 331 and 333, the liquid crystal molecules may move to a first orientation, different than the initial orientation. Once the controller stops applying voltage to the ITO films 331 and 333, the liquid crystal molecules 410 may remain stationary in the first orientation. Subsequently, the controller may cause a second voltage to be generated across the ITO films, different from the first voltage. Thus, the liquid crystal molecule orientation may change to a second orientation. When the second voltage is removed, the liquid crystal molecules may remain stationary in the second orientation until another voltage is generated across the first ITO film 331 and the second ITO film 333.

In some embodiments, the liquid crystal portion 203 may have an unstable configuration. The liquid crystal molecules 410 may be in an initial orientation when no voltage is supplied. When the first voltage described above with respect to the stable configuration is supplied to the liquid crystal layer (as a voltage difference across the ITO films 331 and 333), the orientation of the liquid crystal molecules changes to the first orientation. In the unstable configuration, when the first voltage is removed, the orientation of the liquid crystal molecules no longer stays in the first orientation but may instead revert back to the initial orientation. When a different voltage (e.g., the second voltage described above) is applied, the liquid crystal molecules may change orientation accordingly, e.g., to the second orientation. As with removal of the first voltage, when the second voltage is removed, the liquid crystal molecules will no longer stay in the second orientation and may revert back to the initial orientation.

FIG. 5 is an enlarged view of a second portion of the lens assembly 120, labeled "B" in FIG. 2. As shown in FIG. 2, the second portion corresponds to a top edge of the lens assembly 120 and includes a sealing structure. A similar sealing structure is located around the bottom edge of the lens assembly. The sealing structure includes a sealant 541 that seals the gap between the plano-concave lens 210 and the Fresnel lens 220 to prevent the entry of impurities or contaminants as well as to prevent the liquid crystal layer 332 from leaking out. In some embodiments, the sealant 541 is an ultraviolet (UV) sealant. For example, the sealant 541 can be formed of a liquid adhesive that can be deposited around the perimeter of the lens assembly 120 (e.g., through injection) and cured solid through application of UV light.

The sealing structure further includes a convex ring 542 and a groove 543. The convex ring 542 may be provided on the plano-concave lens 210, arranged along the edge of the plano-concave lens 210. The groove 543 may be provided on the Fresnel lens 220. Alternatively, the convex ring 542 may be provided on the Fresnel lens 220, along the edge of the Fresnel lens 220, and the groove 543 may be provided on the plano-concave lens 210. In either case, the groove 543 may have a shape matching that of the convex ring 542. That is, the groove 543 may have a concave surface that mirrors the convex surface of the convex ring 542 so that the groove 543 and the convex ring 542 are configured to mate with each other, e.g., in a nested or interlocking fashion. The combination of the groove 543 and the convex ring 542 forms a concave-convex structure that enhances the sealing properties of the sealing structure to provide a greater degree of sealing compared to the sealant 541 alone. For example, when the groove 543 and the convex ring 542 are mated together, the resulting concave-convex structure may be configured to provide a certain degree of mechanical resistance against movement of the liquid crystal material toward the sealant 541.

Additionally, in some embodiments, the liquid crystal portion 203 may include an insulating film between the first ITO film 331 and the second ITO film 333. The insulating film is formed of an electrically insulating material (a dielectric) and operates to prevent the first ITO film 331 and second ITO film 333 from accidentally coming into contact with each other and conducting, e.g., to prevent a short circuit that would occur if the ITO films overlapped. Therefore, the insulating film may help ensure the working stability of the liquid crystal portion 203. In one example, the insulating film comprises silicon dioxide, which is relatively inexpensive and has a good working stability. The insulating film may be disposed within the liquid crystal layer 332. In some embodiments, the insulating film may divide the liquid crystal layer 332 into separate compartments.

Referring back to FIG. 1, the glasses 100 may include or be electrically connected to a control assembly 150 that includes the power supply and the controller described above. In the example of FIG. 1, the control assembly 150 is embedded in the frame 110 and located between the first lens assembly 120-A and the second lens assembly 120-B. However, the control assembly 150 can be arranged elsewhere on the frame 110 or, in some instances, external to the frame 110. The control assembly 150 may include an input device or user interface that permits a user of the glasses 100 to control the state of the liquid crystal portion 203. For example, the control assembly 150 may include a physical switch or lever that can be set to cause the liquid crystal molecules to be in one of two orientations (e.g., the first orientation and the second orientation described above), where the first orientation produces a refractive index suitable for correcting near-sightedness, and the second orientation produces a refractive index suitable for correcting far-sightedness. Thus, the input device may switch the liquid crystal portion 203 between discrete states.

Alternatively, the input device may permit the liquid crystal portion 203 to gradually transition between states. For example, the glasses 100 may include a rotating dial 160-A that can be turned to incrementally adjust the voltage across the ITO films 331 and 333 in the lens assembly 120-A. Similarly, the glasses 100 may include a rotating dial 160-B that can be turned to incrementally adjust the voltage across the ITO films 331 and 333 in the lens assembly 120-B. In some embodiments, the control assembly 150 may be remotely controlled. For example, the control assembly 150 may include a wireless communications interface that permits the user to control the state of the liquid crystal portion 203 through a command sent wirelessly from a remote control device.

Additionally, in some embodiments, the control assembly 150 may be programmable to permit the user to configure the glasses 100 to the user's own vision characteristics. For example, the remote control device can be a computer that executes a software application through which the user can input their eye prescription. The eye prescription may include a refractive power value for each eye, specified in diopters. Based on the user information supplied through the software application, the control assembly 150 may generate and store corresponding settings in a memory of the control assembly 150. For example, the control assembly 150 may be configured to convert a refractive power value specified for the user's right eye into a corresponding voltage value for controlling the lens assembly 120-A. Similarly, the control assembly 150 may convert a refractive power value specified for the user's left eye into a corresponding voltage value for controlling the lens assembly 120-B.

One or more components of a pair of adjustable focus glasses or system comprising adjustable focus glasses may include a processor and a non-transitory computer-readable storage medium storing instructions executable by the processor. For example, the controller of the control assembly 150 may include one or more processors configured to execute program code to determine a voltage to apply to a lens assembly. A processor may include multiple processing units executing instructions in parallel. A non-transitory computer-readable storage medium may be any memory, such as a hard disk drive, a removable memory, or a solid-state drive. More generally, any component that processes data may include one or more processing units and/or one or more memory devices. Examples of processing units include a central processing unit (CPU), a field programmable gate array (FPGA), and integrated circuits. In some embodiments, a controller may be hardwired to perform processing that determines a focus adjustment.

The example of FIG. 1 features two lens assemblies 120. However, the number of lens assemblies can vary depending on implementation. For instance, in some embodiments, glasses may include a combination of focus-adjustable lens assemblies and non-adjustable lenses, e.g., when one of the user's eyes does not need correcting. Further, in some embodiments, eyewear may only include a single lens assembly 120, e.g., when worn in the manner of a monocle. Accordingly, a controller may control a single lens assembly or multiple lens assemblies. Further, in some embodiments, separate controllers may be provided to control respective lens assemblies.

The following numbered examples are provided to illustrate possible configurations and combinations of the features described above with reference to the drawings. The numbered examples are exemplary embodiments that are non-limiting. In other embodiments, the features may be combined in a different manner, with certain features being omitted or additional features added. References to specific elements of the drawings should not be interpreted as limiting the scope of such elements, which are described in more general terms above.

Example No. 1

In a first embodiment, adjustable focus liquid crystal glasses may be provided which are suitable for patients who have both myopia and hyperopia. With reference to FIGS. 1 and 2, the adjustable focus glasses include a frame (110) and a pair of lens assemblies (120-A, 120-B) arranged on the frame. The frame is shaped in the manner of a pair of spectacles, including a body in which the lens assemblies are mounted and temples (130-A, 130-B) that are connected to the body of the frame.

Each lens assembly includes a liquid crystal portion (203), a first lens that is a plano-concave lens (210), and a second lens that is a Fresnel lens (220). More specifically, the first (plano-concave) lens is a spherical lens, and the second (Fresnel) lens is an aspheric lens. The first lens and the second lens are located close to each other and form a sandwich structure in which the liquid crystal portion is arranged between the first lens and the second lens.

The first lens includes a planar surface (211) and a concave surface (212) opposite the planar surface. The planar surface is located near and facing the second lens. The second lens includes a Fresnel surface (221) and a convex surface (222). The Fresnel surface is located near and facing the first lens. The optical axis (line 205) connecting the center point of the first lens and the center point of the second lens is perpendicular to the planar surface (211) of the first lens.

The first lens has a refractive index that is the same as the refractive index of the second lens. The liquid crystal portion has a refractive index that can be adjusted independently of the refractive indices of the first lens and the second lens. The liquid crystal portion can be set to a first refractive index in an energized state (e.g., with voltage applied) and a second refractive index in a non-energized state (e.g., in the absence of applied voltage). The first refractive index and the second refractive index are different.

Optionally, the refractive index of the liquid crystal portion is between 1.5 to 1.8. In this embodiment, the refractive indices of the first lens and the second lens are both 1.67, while the liquid crystal portion has a refractive index of 1.67 in a non-energized state and a refractive index of 1.5 in an energized (electrically powered) state.

The lens assembly includes a first ITO layer (the ITO film 331), a liquid crystal layer (332), and a second ITO layer (the ITO film 333) arranged in that order. The first ITO layer is disposed on the planar surface of the first lens, and the second ITO layer is disposed on the Fresnel surface of the second lens. More specifically, the first ITO layer is electroplated and formed on the first lens, and the second ITO layer is electroplated and formed on the second lens.

The edge of the gap between the first lens and the second lens is provided with a sealing structure. That is, the sealing structure is arranged to surround and encircle the edge of the gap between the first lens and the second lens. In this embodiment, the sealing structure includes an UV sealant (541). In order to enhance the sealing effect, the sealing structure further includes a convex ring (542) provided on the second lens and a groove (543) provided on the first lens. The convex ring is arranged along the edge of the second lens. Alternatively, it is also feasible that the convex ring is provided on the first lens, in which case the convex ring is arranged along the edge of the first lens and the groove is provided on the second lens. In either case, the groove has a shape matching the shape of the convex ring so that the convex ring and the groove form a nesting structure.

To ensure the working stability of the liquid crystal portion, an electrically insulating film (not shown) is provided between the first ITO layer (331) and the second ITO layer (333). Optionally, the insulating film is a silicon dioxide film.

Example No. 2

In a second embodiment, the liquid crystal portion of the adjustable focus liquid crystal glasses described above with respect to Example No. 1 is a self-contained liquid crystal assembly that can optionally be formed separately from the first and second lenses. The first substrate and the second substrate are located close (adjacent) to each other but spaced apart to define a gap filled with liquid crystal material. In particular, the liquid crystal portion can be a liquid crystal film that includes a first substrate and a second substrate, with an ITO layer provided (e.g., electroplated) on a surface of each these two substrates. The first substrate and the second substrate can be formed of the same material as the first and second lenses or a different material. In the embodiment of Example No. 2, the first substrate and the second substrate each include polyethylene terephthalate (PET) and may optionally include additional materials.

In contrast to Example No. 1, the ITO layers in this embodiment are formed on the substrates of the liquid crystal assembly instead of on the lens surfaces. More specifically, an inner (liquid crystal facing) surface of the first substrate is provided with a first ITO layer, and an inner surface of the second substrate is provided with a second ITO layer. The liquid crystal material is located between the first substrate and the second substrate and may be in direct contact with the first ITO layer and the second ITO layer. The outer surface of the first substrate faces and is connected to the first lens. Similarly, the outer surface of the second substrate faces and is connected to the second lens.

In Example No. 2, the liquid crystal assembly can include a sealing structure that operates to confine the liquid crystal material and to prevent entry of impurities or contaminants. The sealing structure includes a sealant around the sides of the liquid crystal assembly. In particular, the sealant can be a UV sealant similar to the sealant 541 in FIG. 5. The sealing structure can be formed around the entire perimeter of the liquid crystal assembly to fully surround the sides of the liquid crystal assembly.

Example No. 3

In a third embodiment, a system including adjustable focus liquid crystal glasses as described above with respect to Example No. 1 or Example No. 2 also includes an electronic controller and a power supply device (e.g., a battery). The controller and the power supply device form a control assembly (150) that is embedded in the frame (110) of the glasses. Alternatively, some or all of the control assembly may be external to the frame. The control assembly is electrically connected to the liquid crystal portion of at least one lens assembly in the glasses. A single controller may control multiple lens assemblies (120-A, 120-B). Alternatively, each lens assembly may be provided with its own controller. The controller of the control assembly can be implemented as circuit board with a rotating dial (160-A and/or 160-B) or some other user input device such as a physical button or control key. The user input device permits a user to manually control the state of the liquid crystal layer (332) in the liquid crystal portion of the glasses. For instance, the user interface may be configured to switch the liquid crystal molecules in the liquid crystal layer between an on state and an off state. In this manner, the refractive index of the liquid crystal layer can be changed through a simple, user-friendly operation.

In summary, the adjustable focus liquid crystal glasses and corresponding control techniques disclosed herein permit the focus position of a lens assembly to be adjusted through changing the refractive index of the liquid crystal material in the lens assembly, using electronic control. Therefore, the adjustable-focus liquid crystal glasses can operate as near-sighted glasses or far-sighted glasses. This is especially beneficial for patients with both myopia and hyperopia, since such patients only need to be equipped with a single pair of glasses, which is significantly more convenient compared to carrying multiple pairs of glasses. Additionally, the adjustable-focus liquid crystal glasses can be constructed in a robust manner to ensure the working stability of the liquid crystal portion of the glasses. For example, as discussed above, a lens assembly may be provided with a sealing structure near the edge of a gap between the lenses of the lens assembly, to prevent impurities from entering the gap and to prevent leakage of the liquid crystal material.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description may describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, and/or hardware.

Steps, operations, or processes described may be performed or implemented with one or more hardware or software modules, alone or in combination with other devices. In some embodiments, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations described. The apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

What is claimed is:

1. A lens assembly comprising:
a plano-concave lens including a planar surface and a concave surface opposite the planar surface;
a Fresnel lens including a Fresnel surface and a convex surface opposite the Fresnel surface;
a liquid crystal layer between the plano-concave lens and the Fresnel lens, wherein the planar surface and the Fresnel surface face the liquid crystal layer; and
a sealing structure adapted to seal the liquid crystal layer, wherein the sealing structure is located near an edge of the plano-concave lens and an edge of the Fresnel lens, wherein:
the sealing structure comprises a convex ring and a groove;
the convex ring is configured to mate with the groove;
the convex ring is located on one of the plano-concave lens or the Fresnel lens; and
the groove is located on the other of the plano-concave lens or the Fresnel lens.

2. The lens assembly of claim 1, further comprising:
a first indium tin oxide (ITO) layer; and
a second ITO layer, wherein the liquid crystal layer is between the first ITO layer and the second ITO layer.

3. The lens assembly of claim 2, wherein the first ITO layer is electroplated onto the planar surface of the plano-concave lens, and wherein the second ITO layer is electroplated onto the Fresnel surface of the Fresnel lens.

4. The lens assembly of claim 2, further comprising:
an insulating film between the first ITO layer and the second ITO layer, wherein the insulating film is formed of an electrically insulating material.

5. The lens assembly of claim 4, wherein the insulating film comprises silicon dioxide.

6. The lens assembly of claim 1, wherein the plano-concave lens and the Fresnel lens have the same refractive index.

7. The lens assembly of claim 1,
wherein the sealing structure comprises one or more sealing elements located in a gap between the plano-concave lens and the Fresnel lens.

8. The lens assembly of claim 7, wherein the sealing structure comprises an ultraviolet (UV) sealant.

9. The lens assembly of claim 1, wherein the liquid crystal layer has a first state and a second state, and wherein the liquid crystal layer has a different refractive index in the first state than in the second state.

10. The lens assembly of claim 9, wherein the liquid crystal layer is configured to be in the first state when subjected to a first voltage, and wherein the liquid crystal layer is configured to be in the second state when subjected to a different voltage or not subjected to any voltage.

11. The lens assembly of claim 9, wherein the liquid crystal layer is configured to maintain a particular state after the liquid crystal layer is no longer being subjected to a voltage that caused the liquid crystal layer to be in the particular state.

12. A pair of adjustable focus glasses comprising:
a frame;
a first optical lens; and
a second optical lens, wherein the first optical lens and the second optical lens are mounted on the frame, and wherein at least one of the first optical lens or the second optical lens is a lens assembly that comprises:
a plano-concave lens including a planar surface and a concave surface opposite the planar surface;
a Fresnel lens including a Fresnel surface and a convex surface opposite the Fresnel surface;
a liquid crystal layer between the plano-concave lens and the Fresnel lens, wherein the planar surface and the Fresnel surface face the liquid crystal layer; and
a sealing structure adapted to seal the liquid crystal layer, wherein the sealing structure is located near an edge of the plano-concave lens and an edge of the Fresnel lens, wherein:
the sealing structure comprises a convex ring and a groove;
the convex ring is configured to mate with the groove;
the convex ring is located on one of the plano-concave lens or the Fresnel lens; and the groove is located on the other of the plano-concave lens or the Fresnel lens.

13. The adjustable focus glasses of claim 12, wherein the lens assembly further comprises:
 a first indium tin oxide (ITO) layer; and
 a second ITO layer, wherein the liquid crystal layer is between the first ITO layer and the second ITO layer.

14. The adjustable focus glasses of claim 13, wherein the first ITO layer is electroplated onto the planar surface of the plano-concave lens, and wherein the second ITO layer is electroplated onto the Fresnel surface of the Fresnel lens.

15. The adjustable focus glasses of claim 13, wherein the lens assembly further comprises:
 an insulating film between the first ITO layer and the second ITO layer, wherein the insulating film is formed of an electrically insulating material.

16. The adjustable focus glasses of claim 15, wherein the insulating film comprises silicon dioxide.

17. The adjustable focus glasses of claim 12, wherein the plano-concave lens and the Fresnel lens have the same refractive index.

18. The adjustable focus glasses of claim 12, wherein:
 the sealing structure comprises one or more sealing elements located in a gap between the plano-concave lens and the Fresnel lens.

19. The adjustable focus glasses of claim 18, wherein the sealing structure comprises an ultraviolet (UV) sealant.

20. The adjustable focus glasses of claim 12, wherein the liquid crystal layer has a first state and a second state, and wherein the liquid crystal layer has a different refractive index in the first state than in the second state.

21. The adjustable focus glasses of claim 20, wherein the liquid crystal layer is configured to be in the first state when subjected to a first voltage, and wherein the liquid crystal layer is configured to be in the second state when subjected to a different voltage or not subjected to any voltage.

22. The adjustable focus glasses of claim 20, wherein the liquid crystal layer is configured to maintain a particular state after the liquid crystal layer is no longer being subjected to a voltage that caused the liquid crystal layer to be in the particular state.

23. The adjustable focus glasses of claim 12, further comprising:
 a power source; and
 an electronic controller connected to the power source, wherein the power source and the electronic controller are arranged on the frame, and wherein the electronic controller is configured to control a state of the liquid crystal layer in at least one lens assembly by causing a voltage to be supplied to the at least one lens assembly.

* * * * *